United States Patent
Miranda

[19]

[11] Patent Number: 5,813,656
[45] Date of Patent: Sep. 29, 1998

[54] MODULAR DUMP VALVE ASSEMBLY IN A SEMICONDUCTOR BATH SYSTEM

[76] Inventor: Henry R. Miranda, 2244 Wellington Dr., Milpitas, Calif. 95035

[21] Appl. No.: 598,048

[22] Filed: Feb. 7, 1996

[51] Int. Cl.$^6$ ..................................................... F16K 3/122
[52] U.S. Cl. ............................ 251/144; 251/63; 251/63.5
[58] Field of Search ..................................... 137/587, 540, 137/315; 251/144, 324, 63, 63.5; 220/DIG. 33, 303

[56] References Cited

U.S. PATENT DOCUMENTS

| | | | |
|---|---|---|---|
| 5,193,579 | 3/1993 | Bauer et al. | 137/540 |
| 5,292,103 | 3/1994 | West et al. | 251/144 X |

FOREIGN PATENT DOCUMENTS

| | | | |
|---|---|---|---|
| 459054 | 12/1936 | United Kingdom | 251/144 |

*Primary Examiner*—Kevin Lee
*Attorney, Agent, or Firm*—Townsend and Townsend and Crew LLP

[57] ABSTRACT

The present invention provides for an easily replaceable dump valve assembly to drain a tank in a semiconductor bath system. The dump valve assembly has a drain at a bottom of the tank, a cap, a sealing plate and an actuator. The drain has an end with a flange around it. The cap has a base and side, with the side having an inward protrusion so that the cap can be fitted over the drain with the inward protrusion engaging the flange. The cap can be removed from the drain by simply disengaging the protrusion from the flange. The sealing plate has a surface to contact the end of the drain opening to seal the drain. To move the sealing plate, the actuator is connected to the cap and plate. The actuator drives the plate away from the cap base to place the plate surface against the drain end to close the dump valve assembly and drives the plate toward the cap to remove the plate surface from the drain opening to open the dump valve assembly.

20 Claims, 5 Drawing Sheets

MODULAR DUMP VALVE ASSEMBLY IN A SEMICONDUCTOR BATH SYSTEM

BACKGROUND OF THE INVENTION

The present invention is related to the field of semiconductor processing and, more particularly, to the design of semiconductor bath systems used in cleaning and rinsing semiconductor wafers.

While semiconductor bath systems perform some of the more mundane operations in the manufacture of semiconductor devices and integrated circuits, they are still rather complex pieces of equipment. These baths are installed in so-called wet benches in a semiconductor fabrication facility. Thus, the failure in any portion of the bath typically requires removal of the bath system from the wet bench and a disassembly of the system for a repair. Alternatively, the defective bath system is replaced by a completely new system. Thus, an advantage of any bath system and, indeed, any piece of manufacturing equipment, is for modularity of design, i.e., a design by which a defective part in a system can be easily removed for repair or replaced by a new part without removal of the entire system.

One of the operations in a semiconductor bath system is the dump operation by which the chemical cleaner or distilled water in the tank of the system is quickly removed. Presently, dump valves are fixed to the walls of the bath system tank. If the valve fails, then the entire system must be removed and replaced by a new system.

The present invention provides for a modular dump valve assembly by which a defective valve assembly may be quickly removed and replaced by a new assembly. The bath system need not be removed from the wet bench and removal is nearly instantaneous. This results in a considerable savings in manufacturing time and replacement costs.

SUMMARY OF THE INVENTION

To accomplish these ends, the present invention provides for an dump valve assembly to drain a tank in a semiconductor bath system. The dump valve assembly has a drain at a bottom of the tank, a cap, a sealing plate and an actuator. The drain has an end with a flange around it. The cap has a base and side, with the side having an inward protrusion and being dimensioned and sufficiently elastomeric so that the cap can be fitted over the drain with the inward protrusion engaging the flange and can be removed from the drain by disengaging the protrusion from the flange. The sealing plate has a surface to contact the end of the drain opening to seal the drain. To move the sealing plate, the actuator is connected to the cap and plate. The actuator drives the plate away from the cap base to place the plate surface against the drain end to close the dump valve assembly and drives the plate toward the cap to remove the plate surface from the drain opening to open the dump valve assembly.

This dump valve assembly also produces little stress on the tank bottom compared to previous dump valve assemblies which were fixed to the tank.

DETAILED DESCRIPTION OF PREFERRED EMBODIMENTS

Figure 1A:
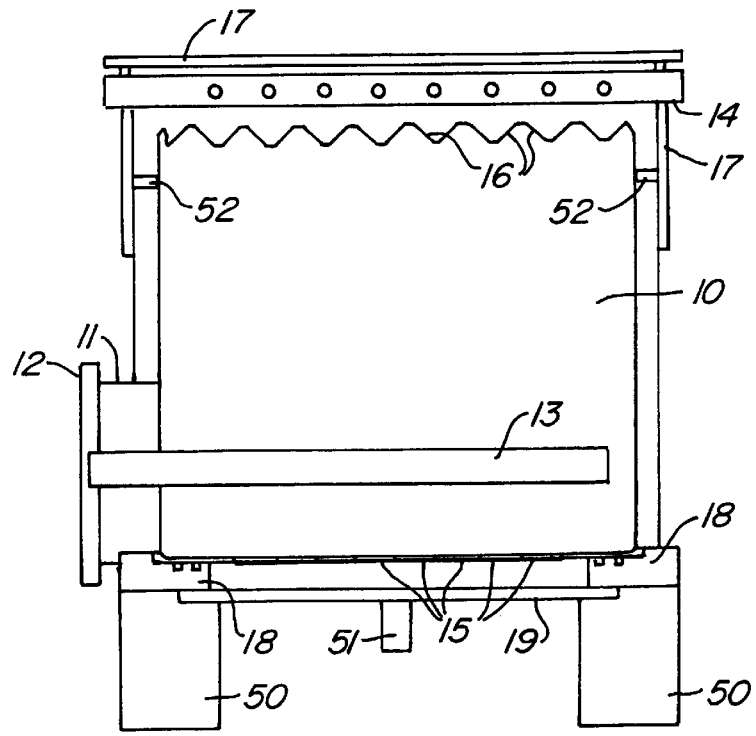
FIG. 1A is a cross-sectional side view of a semiconductor bath system having the dump valve assembly according to one embodiment of the present invention.
Figure 1B:
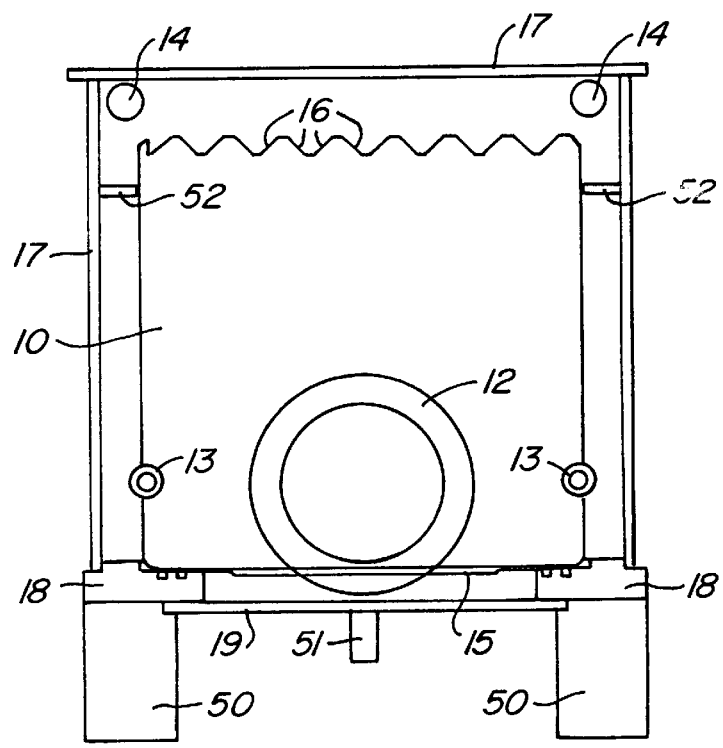
FIG. 1B is a cross-sectional front view of the bath system of FIG. 1A.

FIGS. 1A and 1B show side and front representational views of a semiconductor bath system. The system has a quartz tank 10 having scalloped edges 16 at the top of the tank and a drain 11 at the bottom of the tank 10. In the walls of the tank are tubular fill bars 13. The tank 10 rests upon alignment blocks 18 at each corner of the bottom of the tank 10. Around the sides and top of the tank 10 is a top housing 17 which has an opening at the top to permit access to the top of the tank 10. The top housing 17 has tubular spray bars 14 over opposing top edges of the tank 10 and rests upon the alignment blocks 18. The alignment blocks 18 are mounted to a bottom housing plate 19 through which a fitting 51 is attached. The alignment blocks 18 and bottom housing plate 19 are connected to legs 50 which raise the semiconductor bath system.

The fill bars 13 and spray bars 14 have holes along the length of the bars in the area of the tank 10. During operation of the bath system, a chemical cleaning solution or distilled water is pumped through the fill bars 13 and spray bars 14 into the tank 10. This causes the cleaning solution or water to spill over the scalloped edges 16 of the top of the tank 10. The spilt liquid is collected by the housing bottom plate 19 and sent through the fitting 51 to a pump (not shown), which sends the filtered liquid back into the fill bars 13 and spray bars 14. In this manner, the semiconductor wafers which are placed in the tank 10 are subjected to a constant flow of fresh cleaning solution or water. To aid in the cleaning of the wafers, sonic energy is generated by the piezoelectric transducers 15 which are mounted on the bottom of the tank 10. The sonic energy, typically at a frequency of several hundred kilohertz, generates energy to loosen contaminating particles from the wafers.

Periodically, it is desirable that the cleaning solution or water be completely replaced. In current bath systems, this is done with a so-called "dump" valve attached to a drain at the bottom of a tank. When the dump valve is opened, the chemical cleaning solution or water pours out through the dump valve for a quick drain of the semiconductor bath system. However, these dump valves are fixed to the drains of the tank.

Figure 2:
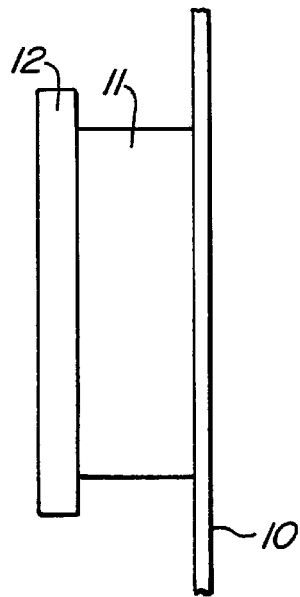
FIG. 2 is a detailed view of the drain of the tank of the bath system of FIG. 1A.

According to the present invention, the dump valve assembly is modularized. As shown in FIGS. 1A and 1B, the bottom of one of the side walls of the tank 10 has a drain 11. The drain 11 fits over an opening in the side wall and extends away from the side wall. The drain 11 ends in a flange 12, as shown in the simplified isolation drawing of FIG. 2.

Figure 3A:
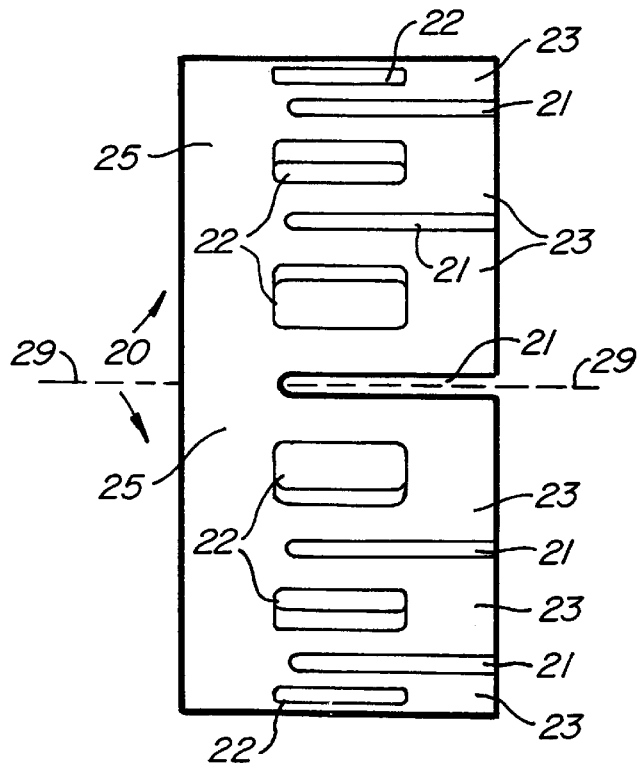
FIG. 3A is a detailed side view of the cap of the dump valve assembly for the semiconductor bath system of FIG. 1A.
Figure 3B:
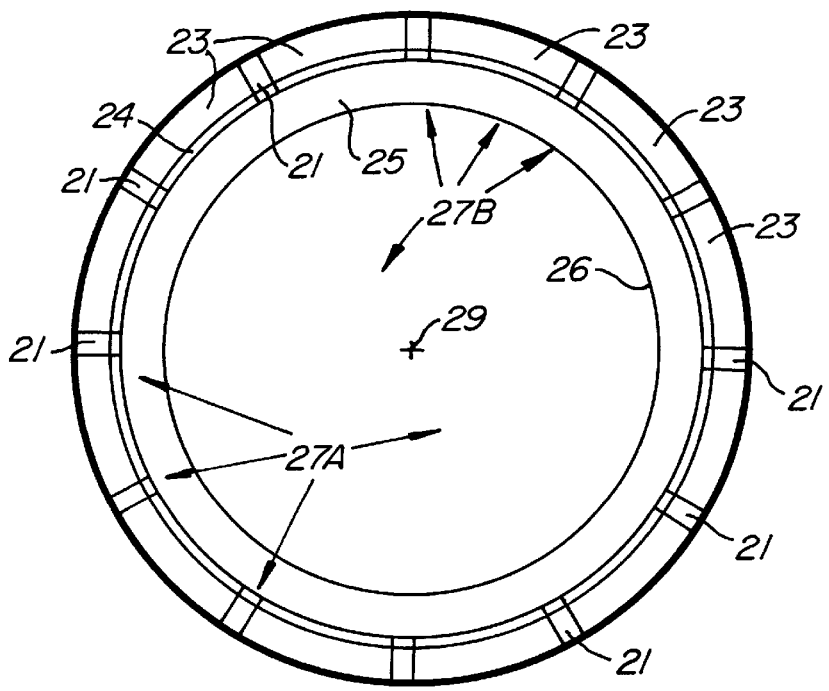
FIG. 3B is a front view of the cap of FIG. 3A.
Figure 3C:
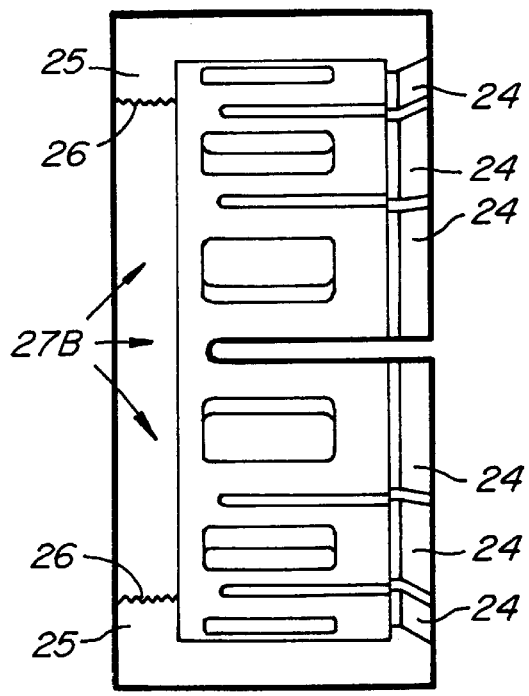
FIG. 3C is a cross-sectional side view of the cap of FIG. 3A.

Over the end of the drain 11 fits a cap 20 illustrated in FIGS. 3A–3C. The cap 20 is formed by plastic material, such as polyvinyl chloride (PVC), polyvinyl difluoride (PVDF) or natural polypropylene. The plastic material is chemically compatible with the contents of the tank 10. The cap 20 has a base 25 and sides formed by fingers 23 extending from the base 25 to form a central opening 27A. The cap 20 is rotationally symmetric around a central axis 29 and the base 25 also has a central opening 27B so that the two openings 27A and 27B render the cap 20 open along the axis 29. The central openings 27A and 27B are indicated in FIG. 3B.

As shown in FIG. 3A, the sides of the cap 20 extend from the base 25. The sides has slots 21 which extend from the side facing the drain 11 (away from the base 25) into the cap sides to form the fingers 23 between the slots 21. The slots 21 allow the fingers 23 to be somewhat flexible. In each finger 23 there is an opening 22. As illustrated in FIG. 3B, the particular cap has twelve slots 21 with twelve fingers 23. Besides permitting flexibility in the fingers 23, the slots 21 and the openings 22 allow the cleaning solution or water to pass through the cap 20 from the drain 11 during an dumping operation when the valve assembly is open. The cap 20 matches the dimensions of the circular drain 11 and flange 12.

FIG. 3C is a representational cross section of the cap 20. The base 25 of the cap 20 has screw threads 26 around the central opening 27B. Furthermore, the inside of the ends of the fingers 23 have inwardly projecting lugs 24. The lugs 24 are slanted inwardly toward the central opening 27A. This permits the fingers 23 to be pushed against the flange 12 to open the fingers 23 until the lugs 24 snap over the flange 12. As shown in FIG. 3C, the lugs 24 in cross section form a barbed shape. The cap 20 fits over the flange 12 of the drain 11. The lugs 24 snap over the flange 12 to hold the cap 20 in place.

Figure 5:
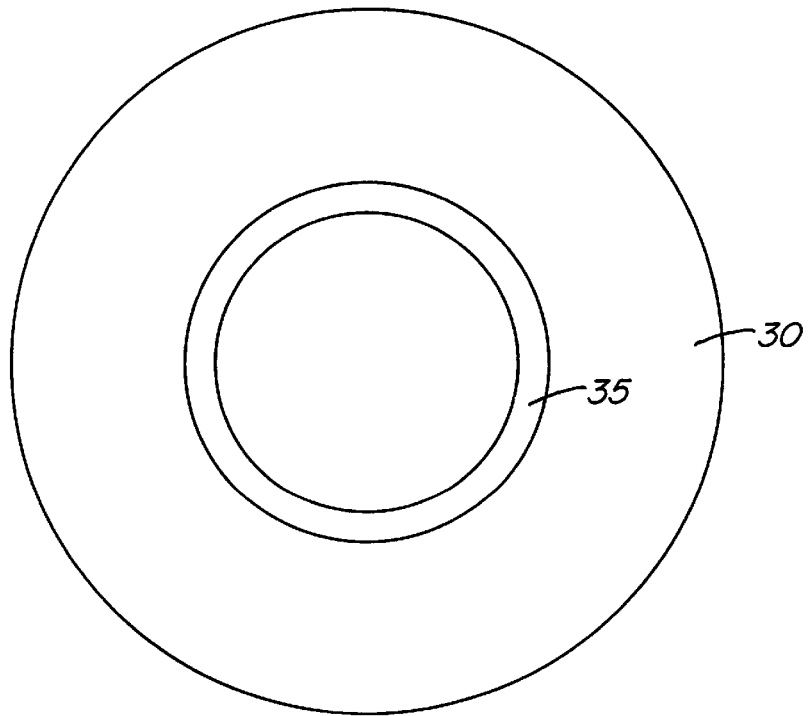
FIG. 5 is a front view of the sealing plate in FIG. 4.

The dump valve assembly also has a circular sealing plate 30. The plate 30 fits inside the central opening 27A inside the fingers 23 of the cap 20. The plate 30 presses against the end of the flange 12 to close the dump valve assembly. The plate 30 moves away from the flange 12 to open the valve. As shown in FIG. 5, the surface of the sealing plate 30 has circular grooves 35 to match the shape of the flange 12 to perform a good seal. Attached to the front of the sealing plate 30 is a gasket 31 which covers the front surface of the sealing plate 30. The gasket is made from a chemically compatible, soft sealing material suede, as Goretex, a trademark of the W. L. Gore Company of Wilmington, Del. On the back surface 34 of the sealing plate 30 there is a circular mount 32 with an attachment 33.

Figure 6:
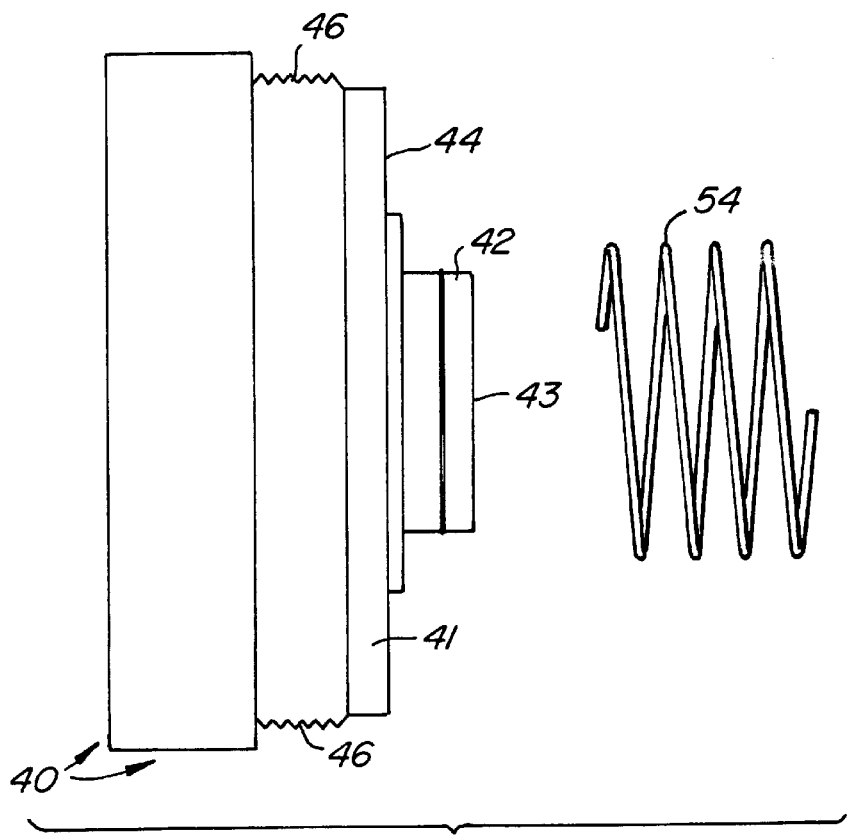
FIG. 6 is a diagrammatic side view of the actuator subassembly which attaches to the cap and drives the sealing plate of FIG. 4.
Figure 4:
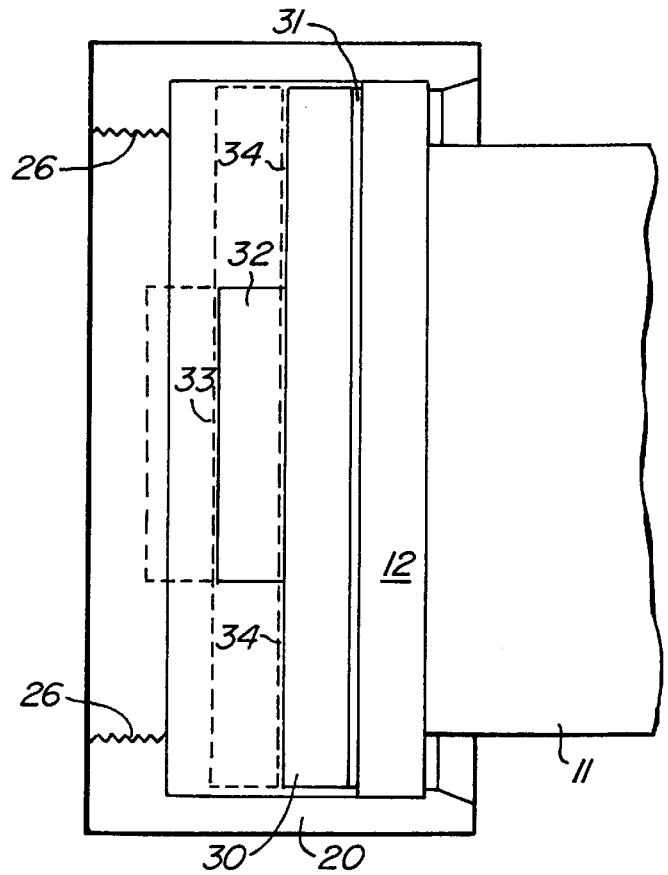
FIG. 4 is a representational side view of the cap mounted to the drain with a sealing plate in the closed position according to one embodiment of the present invention.

The sealing plate 30 is driven by an actuator subassembly 40 illustrated in FIG. 6. The subassembly 40 has an actuator housing 41 which has screw threads 46 which engage the threads 26 of the cap 20. Protruding from the circular actuator housing 41 and in line with the central axis of the assembly 41 is a drive piston 42 which has a hooking attachment 43 which engages the attachment 33. A spring 54 fits between the actuator housing 41 and the sealing plate 30. The spring engages the front surface 44 of the housing 41 and the back surface 34 of the sealing plate 30 around the drive piston 42 and extension 32.

Figure 7:
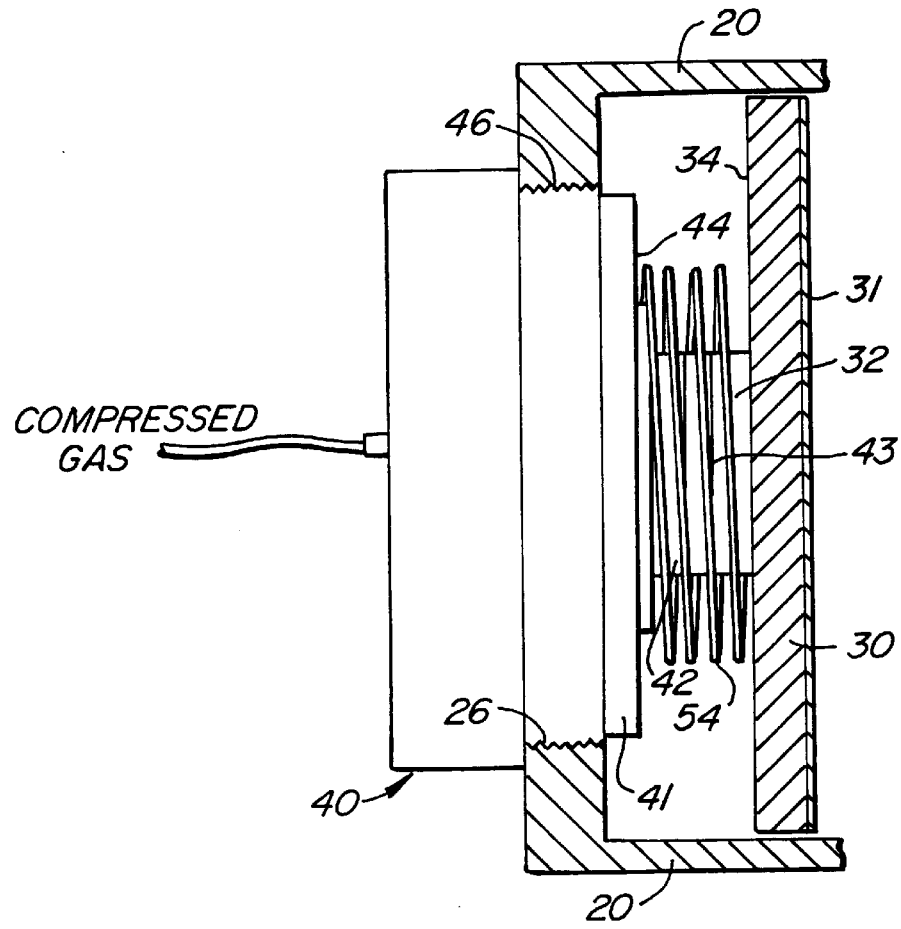
FIG. 7 is a diagrammatic side view which illustrates the assembly of the actuator subassembly, the sealing plate and the cap.

When the actuator subassembly 40 is screwed into the cap 20, as illustrated in FIG. 7, the spring 54 drives the sealing plate 30 against the flange 12 to close the dump valve assembly. To open the valve, the actuator subassembly through compressed gases (not shown) drives the cylinder 42 into the actuator housing 41. This pulls the sealing plate 30 away from the flange 12 to open the valve. The actuator subassembly can be purchased from R. K. Enterprises of Ontario, Calif. As explained above, the chemical cleaning solutions or distilled water escapes from the tank vent through the slots 21 and apertures 22.

Thus, if the dump valve assembly malfunctions, repairs can be performed without removal of the semiconductor bath system and disassembly of the system. The fingers 23 of the cap 20 are pried apart slightly and the cap is removed from the flange 12 of drain 11. The cap and/or sealing plate or actuator subassembly can be easily replaced and then refitted over the drain 11. This manufacturing "down time" is substantially reduced and repair costs are minimized.

While the above is a complete description of the preferred embodiments of the present invention, various alternatives, modifications and equivalents may be used. It should be evident that the present invention is equally applicable by making appropriate modifications to the embodiment described above. For instance, the flange may be placed around the end of the drain. But rather than on the outside of the drain, the flange is placed on the inside. In that case, the cap has outward protrusions which engage the inward flange when the cap is fitted over the drain. Therefore, the above description should not be taken as limiting the scope of invention which is defined by the metes and bounds of the appended claims.

What is claimed is:

1. In a semiconductor bath system having a tank, a dump valve assembly comprising:

a drain at a bottom of said tank, said drain having an end and a flange around said end;

a cap having a base and a side, said side having an inward protrusion and being dimensioned and sufficiently elastomeric so that said cap can be fitted over said drain with said inward protrusion engaging said flange and can be removed from said drain by disengaging said protrusion from said flange;

a plate having a surface to contact said end of said drain to seal said drain opening; and an actuator connected to said cap and said plate, said actuator driving said plate away from said cap base to place said plate surface against said drain end and to drive said plate toward said cap base to remove said plate surface from said drain end.

2. The dump valve assembly of claim 1 wherein said side of said cylindrical cap has slots forming elastomeric engagement fingers, each finger having a portion of said inward protrusion at an end of said finger.

3. The dump valve assembly of claim 2 wherein said elastomeric engagement fingers have drain apertures therethrough.

4. The dump valve assembly of claim 3 wherein said cap comprises a material selected from the group of polyvinyl chloride (PVC), polyvinyl difluoride (PVDF), and polypropylene.

5. The dump valve assembly of claim 1 further comprising a gasket on said surface of said plate to further seal said drain opening.

6. The dump valve assembly of claim 1 wherein said surface of said plate has depressions for engaging said drain end.

7. The dump valve assembly of claim 6 wherein said depressions comprise a circle in said sealing plate surface.

8. The dump valve assembly of claim 1 wherein said plate comprises a material selected from the group of polyvinyl chloride, PVD, and polypropelene.

9. The dump valve assembly of claim 1 wherein said actuator is powered in at least one direction by compressed gas.

10. The dump valve assembly of claim 9 wherein said actuator is powered by a spring to drive said plate away from said cap base.

11. The dump valve assembly of claim 1 wherein said drain is on a side wall of said tank.

12. A cap for a dump valve assembly in a semiconductor bath system, said system having a tank with a drain opening, said drain opening having an end and a flange around said end, said cap comprising:

a base and a side, said side having an inward protrusion and being dimensioned and sufficiently elastomeric so that said cap can be fitted over said drain opening with said inward protrusion engaging said flange and can be removed from said drain opening by disengaging said protrusion from said flange, said base having screw threads for mounting an actuator connected to a plate, said plate having a surface to contact said end of said drain opening to seal said drain opening, said actuator driving said plate away from said cap base to place said plate surface against said drain opening end and to drive said plate toward said cap base to remove said plate surface from said drain opening.

13. The cap of claim 12 wherein said side of said cap has slots forming elastomeric engagement fingers, each finger having a portion of said inward protrusion at an end of said finger.

14. The cap of claim 13 wherein said elastomeric engagement fingers have drain apertures therethrough.

15. For a semiconductor bath system having a tank with a drain opening, said drain opening having an end and a flange around said end, a cap subassembly comprising:

a cap having a base and a side, said side having a protrusion and being dimensioned and sufficiently elastomeric so that said cap can be fitted over said drain opening with said protrusion engaging said flange and can be removed from said drain opening by disengaging said protrusion from said flange; said base;

a plate having a surface to contact said end of said drain opening to seal said drain opening; and an actuator mounted to said base of said cap, said actuator driving said plate away from said cap base to place said plate surface against said drain opening end and to drive said plate toward said cap base to remove said plate surface from said drain opening.

16. The cap subassembly of claim 15 wherein said protrusion of said cap side is inward to engage said flange.

17. The cap subassembly of claim 15 wherein said side of said cylindrical cap has slots forming elastomeric engagement fingers, each finger having a portion of said protrusion at an end of said finger.

18. The cap subassembly of claim 17 wherein said elastomeric engagement fingers have drain apertures therethrough.

19. The cap subassembly of claim 15 wherein said actuator is powered by a spring to drive said plate away from said cap base.

20. The cap subassembly of claim 19 wherein said actuator is powered by compressed gas to drive said plate toward said cap base.

* * * * *